United States Patent
Wake et al.

(10) Patent No.: US 6,840,741 B1
(45) Date of Patent: Jan. 11, 2005

(54) LEADING EDGE SLAT AIRFOIL FOR MULTI-ELEMENT ROTOR BLADE AIRFOILS

(75) Inventors: Brian E. Wake, South Glastonbury, CT (US); Peter F. Lorber, Coventry, CT (US); Robert C. Moffitt, Seymour, CT (US); Ray-Sing Lin, Glastonbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/685,220

(22) Filed: Oct. 14, 2003

(51) Int. Cl.[7] .............................................. B64C 11/18
(52) U.S. Cl. .............................. 416/227 A; 416/223 R; 416/228; 416/231 B; 416/236 R; 416/243; 416/DIG. 2
(58) Field of Search ....................... 416/223 R, 231 R, 416/231 B, 228, 235, 236 R, 237, 243, DIG. 2, 227 R, 227 A

(56) References Cited

U.S. PATENT DOCUMENTS

| | | | |
|---|---|---|---|
| 1,742,792 A | * | 1/1930 | Stahl .......................... 416/228 |
| 4,519,746 A | * | 5/1985 | Wainauski et al. ...... 416/223 R |
| 4,636,143 A | * | 1/1987 | Zeides ......................... 416/228 |
| 4,776,531 A | | 10/1988 | Noonan |
| 4,941,803 A | * | 7/1990 | Wainauski et al. .......... 416/242 |
| 5,267,834 A | | 12/1993 | Dinh et al. |
| 5,286,169 A | | 2/1994 | Dinh et al. |
| 5,299,915 A | | 4/1994 | Dinh et al. |
| 5,393,200 A | | 2/1995 | Dinh et al. |
| 5,445,498 A | | 8/1995 | Williams et al. |
| 6,068,446 A | * | 5/2000 | Tangler et al. .......... 416/223 R |
| 6,474,948 B1 | | 11/2002 | Pirolla et al. |
| 6,503,059 B1 | | 1/2003 | Frost et al. |

OTHER PUBLICATIONS

J.C. Narramore, W.J. McCroskey, K.W. Noonan, "Design and Evaluation of Multi–Element Airfoils for Rotorcraft," presented at the American Helicopter Society, 55th Annual Forum, Montreal, Quebec, Canada May 25–27, 1999.

* cited by examiner

Primary Examiner—Christopher Verdier
(74) Attorney, Agent, or Firm—Carlson, Gaskey & Olds

(57) ABSTRACT

A leading edge slat for multi-element rotor blade applications which provide multiple benefits and provide design direction which has heretofore been unexplored.

4 Claims, 14 Drawing Sheets

7C AND LDA COORDINATES.

LDA COORDINATES.

SLAT SA-MEA-7C

| UPPER | | LOWER | |
|---|---|---|---|
| 0.00058 | 0.00000 | 0.00033 | -0.00069 |
| 0.00091 | 0.00073 | 0.00015 | -0.00129 |
| 0.00139 | 0.00155 | 0.00000 | -0.00255 |
| 0.00204 | 0.00245 | 0.00004 | -0.00320 |
| 0.00398 | 0.00441 | 0.00061 | -0.00511 |
| 0.00688 | 0.00657 | 0.00197 | -0.00675 |
| 0.01075 | 0.00894 | 0.00431 | -0.00859 |
| 0.01307 | 0.01021 | 0.00562 | -0.00939 |
| 0.01849 | 0.01282 | 0.00975 | -0.01139 |
| 0.02159 | 0.01413 | 0.01189 | -0.01229 |
| 0.02493 | 0.01538 | 0.01425 | -0.01304 |
| 0.02847 | 0.01653 | 0.01670 | -0.01366 |
| 0.03212 | 0.01753 | 0.01998 | -0.01436 |
| 0.03581 | 0.01835 | 0.02202 | -0.01469 |
| 0.03953 | 0.01899 | 0.02478 | -0.01498 |
| 0.04328 | 0.01948 | 0.03133 | -0.01540 |
| 0.04705 | 0.01984 | 0.03510 | -0.01553 |
| 0.05085 | 0.02003 | 0.03893 | -0.01556 |
| 0.05467 | 0.02015 | 0.04294 | -0.01549 |
| 0.05851 | 0.02019 | 0.04695 | -0.01532 |
| 0.06238 | 0.02012 | 0.05106 | -0.01499 |
| 0.06628 | 0.02001 | 0.05527 | -0.01446 |
| 0.06994 | 0.01973 | 0.05962 | -0.01365 |
| 0.07363 | 0.01942 | 0.06424 | -0.01250 |
| 0.08102 | 0.01843 | 0.06926 | -0.01098 |
| 0.08468 | 0.01783 | 0.07497 | -0.00899 |
| 0.08830 | 0.01718 | 0.08188 | -0.00645 |
| 0.09537 | 0.01590 | 0.08931 | -0.00393 |
| 0.10217 | 0.01468 | 0.09607 | -0.00202 |
| 0.10864 | 0.01348 | 0.10224 | -0.00060 |
| 0.11172 | 0.01286 | 0.10784 | 0.00044 |
| 0.11760 | 0.01157 | 0.11296 | 0.00122 |
| 0.12037 | 0.01091 | 0.11752 | 0.00178 |
| 0.12305 | 0.01024 | 0.12164 | 0.00217 |
| 0.12560 | 0.00958 | 0.12528 | 0.00244 |
| 0.12807 | 0.00893 | 0.12852 | 0.00261 |
| 0.13041 | 0.00830 | 0.13142 | 0.00272 |
| 0.13267 | 0.00769 | 0.13396 | 0.00276 |
| 0.13479 | 0.00711 | 0.13618 | 0.00275 |
| 0.13685 | 0.00654 | 0.13819 | 0.00269 |
| 0.14061 | 0.00549 | 0.14000 | 0.00261 |
| 0.14402 | 0.00452 | 0.14302 | 0.00240 |
| 0.14704 | 0.00366 | 0.14632 | 0.00185 |
| 0.14982 | 0.00287 | 0.14876 | 0.00145 |
| 0.15406 | 0.00160 | 0.15392 | 0.00084 |
| 0.15695 | 0.00069 | 0.15652 | 0.00041 |
| 0.15908 | 0.00001 | 0.15905 | -0.00008 |

FIG. 15B

SLAT SA-MEA-LDA

| UPPER | | LOWER | |
|---|---|---|---|
| 0.00052 | 0.00000 | 0.00052 | 0.00000 |
| 0.00086 | 0.00075 | 0.00010 | -0.00134 |
| 0.00135 | 0.00158 | 0.00000 | -0.00198 |
| 0.00203 | 0.00247 | 0.00008 | -0.00331 |
| 0.00293 | 0.00340 | 0.00024 | -0.00399 |
| 0.00406 | 0.00438 | 0.00092 | -0.00527 |
| 0.00702 | 0.00644 | 0.00201 | -0.00637 |
| 0.00886 | 0.00756 | 0.00323 | -0.00738 |
| 0.01092 | 0.00873 | 0.00452 | -0.00833 |
| 0.01324 | 0.00996 | 0.00589 | -0.00920 |
| 0.01580 | 0.01123 | 0.00792 | -0.01032 |
| 0.01862 | 0.01250 | 0.01006 | -0.01142 |
| 0.02169 | 0.01376 | 0.01218 | -0.01240 |
| 0.02499 | 0.01496 | 0.01477 | -0.01333 |
| 0.02850 | 0.01606 | 0.01815 | -0.01429 |
| 0.03211 | 0.01702 | 0.02129 | -0.01504 |
| 0.03577 | 0.01780 | 0.02325 | -0.01539 |
| 0.03946 | 0.01839 | 0.02587 | -0.01570 |
| 0.04318 | 0.01885 | 0.02888 | -0.01594 |
| 0.04693 | 0.01918 | 0.03218 | -0.01618 |
| 0.05071 | 0.01936 | 0.03582 | -0.01636 |
| 0.05451 | 0.01946 | 0.03951 | -0.01643 |
| 0.05834 | 0.01949 | 0.04337 | -0.01638 |
| 0.06219 | 0.01939 | 0.04723 | -0.01620 |
| 0.06607 | 0.01925 | 0.05121 | -0.01585 |
| 0.06972 | 0.01898 | 0.05529 | -0.01528 |
| 0.07340 | 0.01865 | 0.05953 | -0.01444 |
| 0.07709 | 0.01820 | 0.06404 | -0.01327 |
| 0.08076 | 0.01768 | 0.06896 | -0.01173 |
| 0.08441 | 0.01709 | 0.07455 | -0.00972 |
| 0.08802 | 0.01648 | 0.08133 | -0.00717 |
| 0.09506 | 0.01526 | 0.08866 | -0.00461 |
| 0.10183 | 0.01410 | 0.09536 | -0.00264 |
| 0.10827 | 0.01296 | 0.10151 | -0.00116 |
| 0.11134 | 0.01236 | 0.10710 | -0.00006 |
| 0.11719 | 0.01113 | 0.11223 | 0.00078 |
| 0.11995 | 0.01050 | 0.11678 | 0.00138 |
| 0.12262 | 0.00985 | 0.12091 | 0.00181 |
| 0.12761 | 0.00859 | 0.12456 | 0.00211 |
| 0.12994 | 0.00799 | 0.12780 | 0.00232 |
| 0.13219 | 0.00740 | 0.13071 | 0.00245 |
| 0.13635 | 0.00629 | 0.13549 | 0.00253 |
| 0.14349 | 0.00435 | 0.14236 | 0.00225 |
| 0.14926 | 0.00276 | 0.14897 | 0.00160 |
| 0.15349 | 0.00154 | 0.15339 | 0.00096 |
| 0.15637 | 0.00067 | 0.15598 | 0.00050 |
| 0.15850 | 0.00000 | 0.15850 | 0.00000 |

FIG. 15C

SLAT SA-MEA-LDB

| UPPER | | LOWER | |
|---|---|---|---|
| 0.00025 | 0.00000 | 0.00025 | 0.00000 |
| 0.00092 | 0.00151 | 0.00007 | -0.00067 |
| 0.00148 | 0.00235 | 0.00000 | -0.00186 |
| 0.00228 | 0.00320 | 0.00011 | -0.00243 |
| 0.00330 | 0.00408 | 0.00063 | -0.00356 |
| 0.00456 | 0.00499 | 0.00104 | -0.00410 |
| 0.00772 | 0.00696 | 0.00276 | -0.00545 |
| 0.00961 | 0.00806 | 0.00397 | -0.00628 |
| 0.01172 | 0.00924 | 0.00521 | -0.00706 |
| 0.01405 | 0.01050 | 0.00711 | -0.00808 |
| 0.01662 | 0.01182 | 0.00891 | -0.00896 |
| 0.02246 | 0.01453 | 0.01277 | -0.01067 |
| 0.02573 | 0.01587 | 0.01482 | -0.01134 |
| 0.02918 | 0.01713 | 0.01819 | -0.01225 |
| 0.03273 | 0.01830 | 0.02120 | -0.01296 |
| 0.03632 | 0.01930 | 0.02311 | -0.01332 |
| 0.03994 | 0.02018 | 0.02549 | -0.01368 |
| 0.04359 | 0.02096 | 0.02810 | -0.01403 |
| 0.04728 | 0.02159 | 0.03122 | -0.01442 |
| 0.05101 | 0.02201 | 0.03465 | -0.01473 |
| 0.05479 | 0.02232 | 0.03848 | -0.01494 |
| 0.05863 | 0.02236 | 0.04264 | -0.01497 |
| 0.06250 | 0.02225 | 0.04715 | -0.01475 |
| 0.06642 | 0.02200 | 0.05202 | -0.01421 |
| 0.07010 | 0.02160 | 0.05732 | -0.01329 |
| 0.07754 | 0.02061 | 0.06317 | -0.01191 |
| 0.08125 | 0.02004 | 0.06980 | -0.00998 |
| 0.08493 | 0.01942 | 0.07765 | -0.00736 |
| 0.09218 | 0.01810 | 0.08579 | -0.00461 |
| 0.09571 | 0.01741 | 0.09316 | -0.00236 |
| 0.10256 | 0.01597 | 0.09986 | -0.00063 |
| 0.10586 | 0.01523 | 0.10592 | 0.00064 |
| 0.11218 | 0.01374 | 0.11142 | 0.00155 |
| 0.11810 | 0.01226 | 0.11629 | 0.00217 |
| 0.12361 | 0.01080 | 0.12067 | 0.00259 |
| 0.12868 | 0.00939 | 0.12793 | 0.00301 |
| 0.13332 | 0.00806 | 0.13363 | 0.00312 |
| 0.13753 | 0.00684 | 0.13805 | 0.00303 |
| 0.14131 | 0.00572 | 0.14161 | 0.00285 |
| 0.14474 | 0.00469 | 0.14441 | 0.00263 |
| 0.14774 | 0.00379 | 0.14662 | 0.00240 |
| 0.15048 | 0.00296 | 0.14994 | 0.00196 |
| 0.15467 | 0.00165 | 0.15495 | 0.00107 |
| 0.15691 | 0.00091 | 0.15787 | 0.00042 |
| 0.15804 | 0.00053 | 0.15824 | 0.00034 |
| 0.15892 | 0.00023 | 0.15895 | 0.00016 |
| 0.15960 | 0.00000 | 0.15960 | 0.00000 |

FIG. 16B

COMPARISON OF SLAT THICKNESS,
CHORD LENGTH AND THICKNESS RATIO.

|  | t | c | t/c |
|---|---|---|---|
| 7C | 0.0339 | 0.159 | 0.213 |
| LDA | 0.0348 | 0.159 | 0.220 |
| LDB | 0.0359 | 0.160 | 0.225 |
| LDC | 0.0337 | 0.129 | 0.262 |

SLAT SA-MEA-LDC

| UPPER | | LOWER | |
|---|---|---|---|
| 0.00034 | 0.00000 | 0.00034 | 0.00000 |
| 0.00153 | 0.00221 | 0.00000 | -0.00132 |
| 0.00427 | 0.00465 | 0.00014 | -0.00275 |
| 0.00703 | 0.00641 | 0.00154 | -0.00479 |
| 0.01047 | 0.00839 | 0.00276 | 0.00606 |
| 0.01463 | 0.01057 | 0.00400 | -0.00729 |
| 0.01955 | 0.01277 | 0.00600 | -0.00906 |
| 0.02229 | 0.01380 | 0.00924 | -0.01169 |
| 0.02518 | 0.01473 | 0.01100 | -0.01276 |
| 0.02816 | 0.01554 | 0.01327 | -0.01392 |
| 0.03117 | 0.01621 | 0.01516 | -0.01477 |
| 0.03422 | 0.01671 | 0.01769 | -0.01563 |
| 0.03730 | 0.01708 | 0.02023 | -0.01621 |
| 0.04040 | 0.01734 | 0.02295 | -0.01669 |
| 0.04352 | 0.01748 | 0.02684 | -0.01724 |
| 0.04666 | 0.01752 | 0.02920 | -0.01741 |
| 0.04982 | 0.01750 | 0.03181 | -0.01748 |
| 0.05299 | 0.01737 | 0.03462 | -0.01743 |
| 0.05619 | 0.01718 | 0.03763 | -0.01722 |
| 0.05920 | 0.01694 | 0.04077 | -0.01682 |
| 0.06220 | 0.01665 | 0.04410 | -0.01620 |
| 0.06517 | 0.01633 | 0.04760 | -0.01532 |
| 0.06810 | 0.01594 | 0.05138 | -0.01415 |
| 0.07100 | 0.01553 | 0.05547 | -0.01268 |
| 0.07384 | 0.01507 | 0.05999 | -0.01088 |
| 0.07935 | 0.01404 | 0.06512 | -0.00875 |
| 0.08461 | 0.01290 | 0.07112 | -0.00632 |
| 0.08957 | 0.01175 | 0.07733 | -0.00406 |
| 0.09194 | 0.01117 | 0.08278 | -0.00236 |
| 0.09645 | 0.01005 | 0.08761 | -0.00113 |
| 0.10065 | 0.00895 | 0.09189 | -0.00025 |
| 0.10453 | 0.00785 | 0.09566 | 0.00036 |
| 0.10807 | 0.00676 | 0.09898 | 0.00080 |
| 0.11130 | 0.00572 | 0.10191 | 0.00113 |
| 0.11424 | 0.00476 | 0.10447 | 0.00136 |
| 0.11688 | 0.00389 | 0.10674 | 0.00154 |
| 0.11924 | 0.00313 | 0.11053 | 0.00177 |
| 0.12033 | 0.00278 | 0.11346 | 0.00179 |
| 0.12138 | 0.00245 | 0.11585 | 0.00171 |
| 0.12237 | 0.00214 | 0.11771 | 0.00159 |
| 0.12327 | 0.00185 | 0.11917 | 0.00146 |
| 0.12408 | 0.00158 | 0.12034 | 0.00133 |
| 0.12484 | 0.00132 | 0.12225 | 0.00109 |
| 0.12554 | 0.00108 | 0.12386 | 0.00085 |
| 0.12618 | 0.00086 | 0.12537 | 0.00058 |
| 0.12676 | 0.00066 | 0.12684 | 0.00030 |
| 0.12777 | 0.00030 | 0.12825 | -0.00001 |
| 0.12858 | 0.00000 | 0.12892 | -0.00016 |

FIG. 17B

LEADING EDGE SLAT AIRFOIL FOR MULTI-ELEMENT ROTOR BLADE AIRFOILS

BACKGROUND OF THE INVENTION

The present invention relates to a multi-element rotor blade, and more particularly to geometry for a leading edge slat.

Multi-element airfoils are in common use on fixed wing aircraft. In such conventional applications, the aerodynamic flow environment is steady or quasi-steady. These airfoil sections are designed specifically for high angles of attack (AOA) and low Mach number conditions since at higher speeds the additional elements are retracted.

Multi-element airfoils offer the potential for a significant breakthrough in rotor performance by providing a higher maximum lift coefficient. Increased lift coefficient enables the rotor to achieve a higher thrust and/or higher flight speeds, impacting the payload/range, maneuverability, reduced tip speed and lower noise signature for rotary-wing aircraft. Multi-element airfoil application to rotary-wing aircraft has concentrated upon the development of fixed elements which attempt to provide a compromise between achieving an average improvement to rotor disc lift while avoiding an unacceptable increase in drag. Fixed elements provide numerous design challenges including the aerodynamic requirements from lower-speed, high angle of attack on the retreating side of the rotor disc to high speed, low angle of attack operation on the advancing side of the rotor disc.

Current designs for high lift in the low speed regime suffer from unacceptable drag levels at high speed while current designs for low drag in the high-speed regime do not show sufficient benefits of increased lift in the low speed regime.

Accordingly, it is desirable to provide a slat shape for multi-element rotor blade airfoils, which maximizes lift performance while minimizing drag in unsteady aerodynamic flow environment and various flight regimes.

SUMMARY OF THE INVENTION

The present invention provides a fixed slat airfoil shape configuration for multi-element rotor blade applications which provide multiple benefits and provide design direction which has heretofore been unexplored. That is, particular known notions for slat design have been biased in directions relative to fixed wing slat design for low-Mach number and high angle of attack.

Accordingly, the present invention provides a slat shape multi-element rotor blade airfoils, which maximizes lift performance while minimizing drag in unsteady aerodynamic flow environment and various flight regimes.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 15B is a chart of the coordinates of the 7C slat shape of FIG. 15A;

FIG. 15C is a chart of the coordinates of the LDA slat shape of FIG. 15A;

FIG. 16B is a chart of the coordinates of the LDB slat shape of FIG. 16A;

FIG. 17B is a chart of the coordinates of the LDC slat shape of FIG. 17A; and

DETAILED DESCRIPTION OF THE PREFERRED EMBODIMENT

Figure 1:
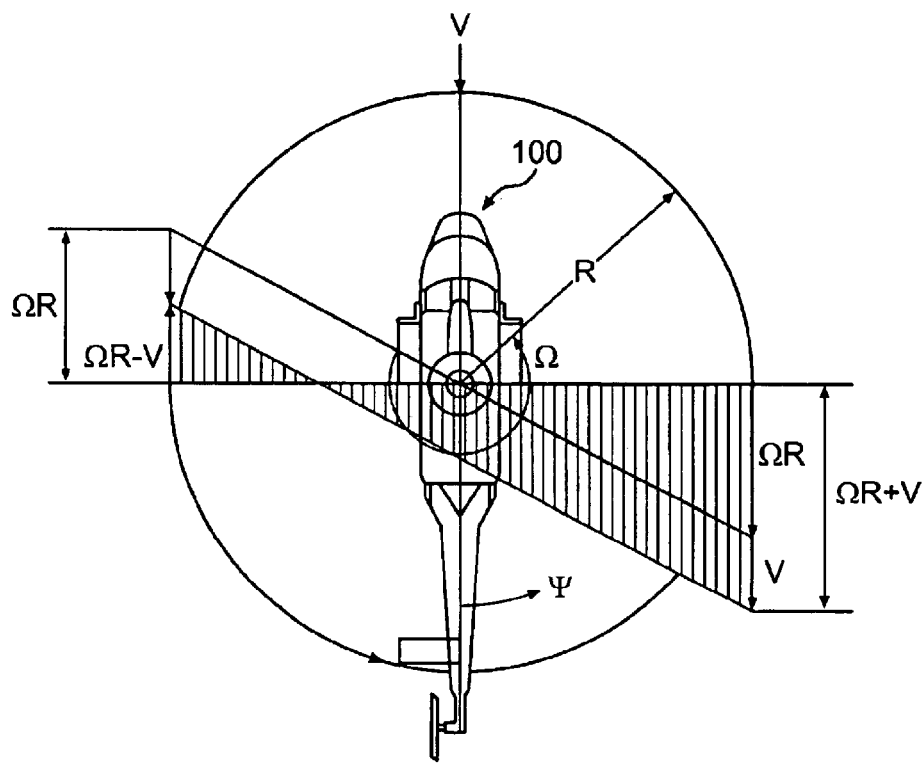
FIG. 1 is a schematic top view illustrating the aerodynamic environment of a helicopter main rotor in forward flight.

FIG. 1 generally illustrates the aerodynamic environment of a helicopter 100 in forward flight having rotor blades of a rotor radius R and rotating at an angular speed Ω, while advancing at a flight velocity V. The speed of the airflow over the advancing blade tip is the rotation based speed ΩR plus the flight velocity V. The airflow over the retreating blade tip is the rotation based speed ΩR minus the flight velocity V. The airspeed difference between the advancing and the retreating blade is, therefore, relatively large.

The azimuth angle Ψ is an angle measured counterclockwise from the tail of the helicopter. It should be understood that, although Ψ is defined, herein, in reference to a counter clockwise rotating rotor, such definition is for convenience only and should not be considered limiting. At an azimuth angle Ψ of 90 degrees, the airspeed of the advancing blade reaches the maximum of ΩR+V. At an azimuth angle Ψ of 270 degrees, the airspeed of the retreating blade reaches the minimum of ΨR−V. The relative airflow at any radial and azimuthal position is obtained by adding a sinusoidal variation of flight speed to the rotational speed component, i.e., V(r, Ψ)=Ωr+Vsin(Ψ), where r is the radial position and Ψ is the azimuthal position.

Figure 2:
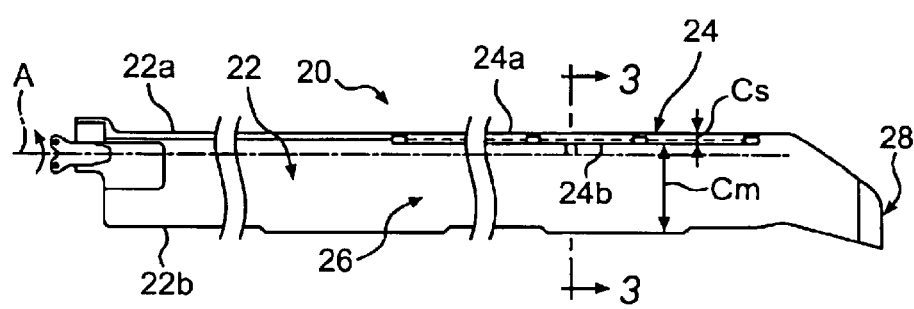
FIG. 2 is a plan view illustrating a multi-element rotor blade according to the present invention.

FIG. 2 is a plan view showing a multi-element (ME) rotor blade 20 having a main element 22 and a fixed slat 24. The ME rotor blade 20 includes a blade root portion 23, a center portion 26, and a blade tip portion 28. Each portion may define a separate ME airfoil section and it should be understood that, although the illustrated embodiment illustrates a particular design, other multi-element airfoils will benefit from the present invention.

The blade root portion 23 is attached to a rotor head (not shown) for rotating the rotor blade 20 about an axis of rotation A. The main element 22 defines a leading edge 22a and a trailing edge 22b, which are generally parallel to each other. The distance between the leading edge 22a and the trailing edge 22b defines a main element chord length Cm. It should be understood that other main rotor, tail rotor blades and aircraft propellers will benefit from the present invention.

The slat 24 is mounted parallel to the leading edge 22a. The slat 24 defines a leading edge 24a and a trailing edge 24b, which are generally parallel to each other. A distance between the leading edge 24a and the trailing edge 24b defines a slat chord length Cs.

Figure 3:
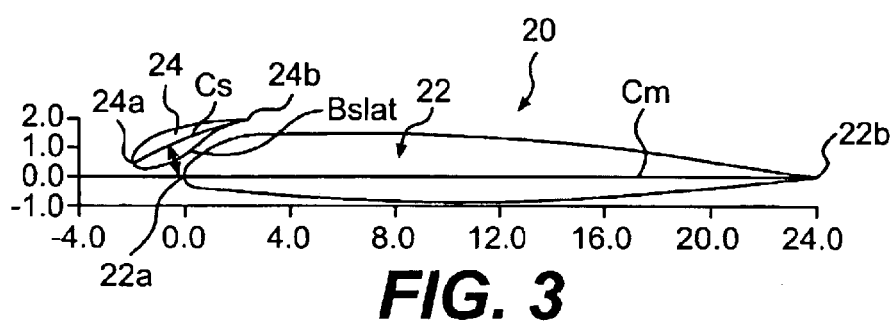
FIG. 3 is a sectional view of the multi-element rotor blade taken along the line 3—3 of FIG. 2.

Referring to FIG. 3, a sectional view of the rotor blade 20 is illustrated. As a frame of reference, the leading edge 22a of the main element 22 defines an origin of coordinates (x, y)=(0, 0).

A set of design rules for multi-element rotor blade applications have been derived by Applicant. It should be understood that various optimization techniques such as CFD may be utilized to determine particular relationships between the main element and the fixed slat. The methodology utilized to determine the disclosed design rules form no part of the present invention. Applicant has determined design rules which provide multiple benefits and provide design direction which has heretofore been unexplored. That is, many known notions for slat design have been biased in directions relative to fixed wing slat design which has left the advantageous design space and design rules determined by Applicant unexplored.

Most of these design rules create trade-offs between high lift and low drag, however some provide benefits for both conditions. The general difference between the design rules discussed herein and those of a fixed wing is that the fixed-wing design is primarily for low-Mach number and high angle of attack. Applicant has determined that in general order of importance, slat angle is most important followed by maintaining a constant slat gap, followed by leading edge radius, slat location and slat chord length.

Slat Angle

Slat angle relative to the main-element chord line is a parameter that has a very strong influence on both the $C_{Lmax}$ and $C_{D0}$. Assuming that the other design parameters are held relatively constant (in particular the slat gap), reduced slat angles (slat leading edge rotated down) will tend to increase both $C_{Lmax}$ and $C_{D0}$. Conversely, increased slat angles will tend to reduce both $C_{Lmax}$ and $C_{D0}$. Varying slat angle tends to produce designs in significantly differ regions of the design space. Thus, it is one of the more important variables to adjust when exploring the design space.

Gap Distribution Between Slat and Main Element

Maintaining a nearly constant gap distribution between the slat and main element and opening of the slat-gap towards the slat trailing edge results in earlier main-element stall, closing of the slat-gap results in a strong shock between the slat trailing edge and main-element upper surface, this also results in early main-element stall. At high Mach number, low-angle condition, a constant slat-gap is desirable to avoid shocks within the gap and the resulting higher drag. This design rule is strongly coupled with many design variables including: surface shape, and slat orientation and chord, thus it impacts many of the other design rules. Due to viscous effects, the actual slot gap may allowably increase toward the slat trailing edge without degrading effects.

Slat Leading-Edge Radius

Optimization of the design for $C_{Lmax}$ and $C_{D0}$ tends to sharpen the leading edge. This sharpening of the leading edge (i.e., reduced leading radius) may penalize the performance at other flow conditions (such as mid-range angles of attack). The slat leading-edge radius is a compromise between optimizing for two disparate designs, while maintaining a robust design at in-between conditions.

Slat Location

Slat location is primarily driven by the constraint to keep the slat-gap nearly constant. This tends to push the slat down as it is rotated down, and push it up when the slat angle is increased (effectively rotating the slat about a point near the leading edge). Assuming the slat gap distribution is nearly constant for $C_{Lmax}$ considerations, the slat must be far enough away to prevent the viscous effects from overly restricting the gap airflow, yet close enough to produce a significant velocity over-speed at the slat-gap exit. At high-Mach, low-angle conditions, a reduced gap is favorable to reduce flow separation behind the slat. In the limit, the $C_{D0}$ is reduced most by closing the slat gap.

Slat Surface

Generally, a ME slat design must be smooth and avoid convex shapes. Flow separation is sensitive to abrupt changes in slope (i.e., high curvature). These effects become more important as the Mach number is increased. The upper surface tends to participate primarily in terms of the increasing $C_{Lmax}$ since the flow separation at high angles occur on the upper surface, conversely the lower surface (near the leading edge) is more important for drag reduction at low angles.

At high angles of attack, the upper surface just aft of the leading edge tends to flatten and align with the oncoming flow. However, an over-exaggeration of this feature leads to higher drag at the mid-range angles of attack. Similarly, at low angles of attack to reduce $C_{D0}$, the lower surface will tend to flatten and align relative to the oncoming flow, reducing the amount of turning the flow must undergo around the lower surface of the airfoil to avoid flow separation.

Slat-Chord Length

An increase in slat-chord length (holding main-element chord constant), tended to increase both the $C_{Lmax}$ and $C_{D0}$ due to the increase in airfoil surface area. In the sensitivity studies performed, this generally penalized the objective function. Conversely, a reduced slat chord length resulted in a reduction of $C_{Lmax}$ and $C_{D0}$, along with very modest changes in the objective function. Although no significant benefit was found, it may be desirable for slat chord length to be added as a design parameter to the optimization procedure.

EXAMPLE A

The objective of this first Example was to position a published slat design over a baseline Sikorsky SC2110 airfoil (a single element high-lift airfoil) to form a multi-element airfoil that will serve as the starting point (or a reference point) for further optimization. In this case, the baseline configuration was determined by a manual CFD design. During the design process, the slat location was then perturbed by translation in the x- and y-directions as well as by rotation about the trailing edge of the slat. There were no constraints imposed on the problem, however, the range of travel was limited by the grid-block boundary set arbitrarily by the grid generation procedure that had been used at this time (Gridgen).

At the beginning of design optimization, the baseline configuration had a $C_{Lmax}$=1.578 (M=0.35) and $C_{D0}$=0.0126 (M=0.7). After optimization a design having a $C_{Lmax}$=1.60 (M=0.35) and $C_{D0}$=0.0114 (M=0.7). Table I lists the $C_{Lmax}$ and $C_{D0}$ of the baseline and the new design.

TABLE I $C_{Lmax}$ and $C_{D0}$ for baseline and 6E.

|  | $C_{Lmax}$ (M = 0.35) | $C_{D0}$ (M = 0.7) |
| --- | --- | --- |
| Baseline | 1.58 | 0.0126 |
| 6E | 1.60 | 0.0114 |

The optimized design, designated as the 6E configuration (illustrated somewhat schematically at FIG. 4), did provide some degree of improvement on both $C_{Lmax}$ and $C_{D0}$. However, the improvement in this case was not exceedingly significant for the baseline configuration had been derived.

SLAT ROTATION

Figure 4:
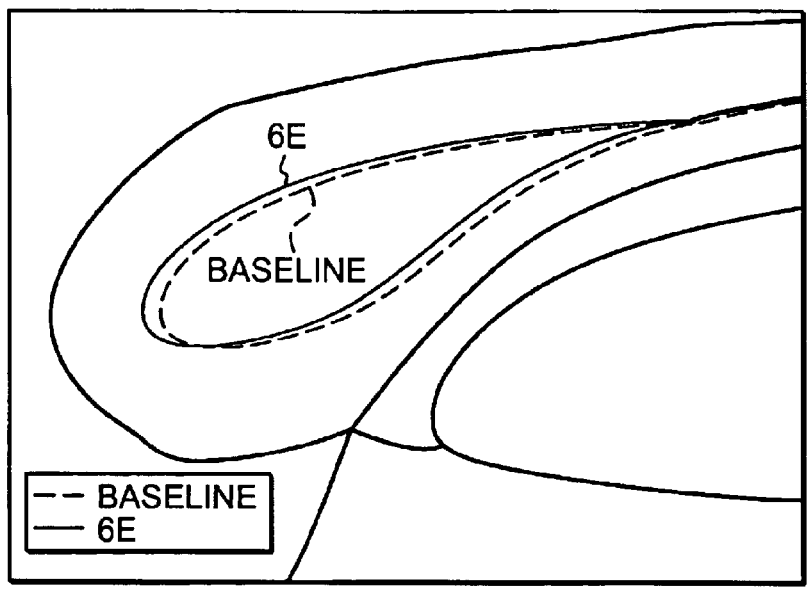
FIG. 4 is a schematic representation of a baseline slat shape compared to a configuration designed from the present invention.

A significant difference between the low-drag multi-element airfoil (the 6E; FIG. 4) and the high lift airfoils that are used for fixed wings is the angle of the slat relative to the main element airfoil. The slat of the low drag multi-element airfoil is higher and at a more positive angle of attack to reduce the flow separation behind the slat at low angles of attack. To produce alternative high lift and low drag designs to the 6E, the slat was rotated relative to the main element. It was translated to maintain a near constant gap width between the slat and the main element.

Figure 5:
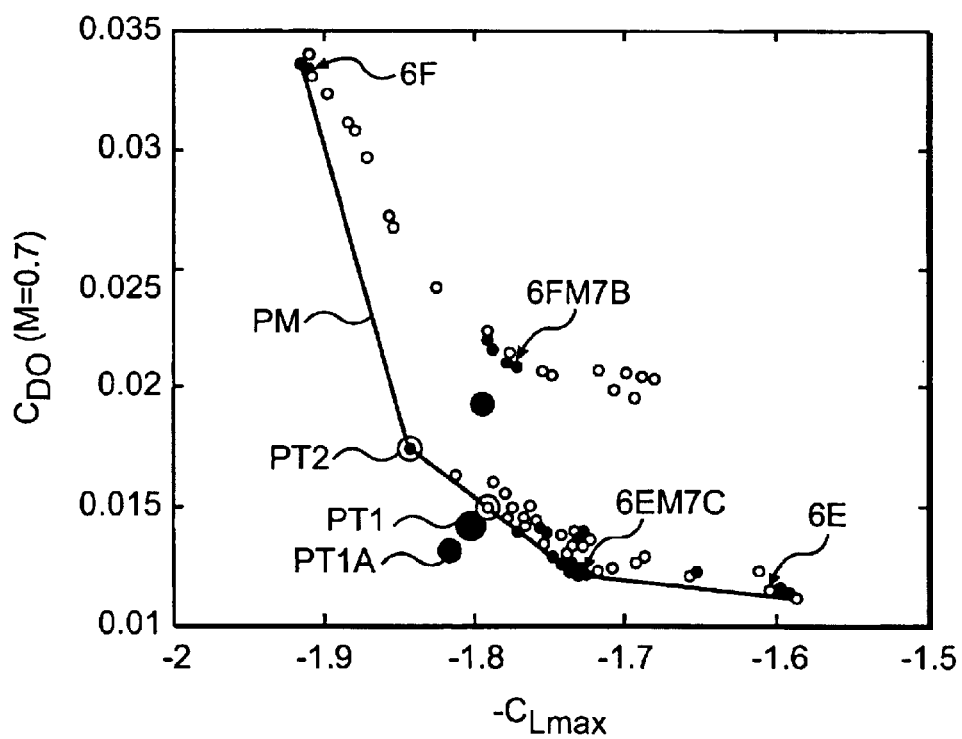
FIG. 5 is a graphical representation of airfoil designs.

Following the design rules, a high-lift design (designated 6F), was created from the 6E by a −7.5 degree rotation of the slat along with a translation in the x-direction to align the gap. Results of wind tunnel tests indicated that up to M=0.5 this 6F configuration consistently had the highest combined $C_{Lmax}$ and the latest stall (FIG. 5). CFD calculations showed that the initial design of the 6F had a high $C_{Lmax}$=1.893, but also had a very high drag coefficient; for example $C_{D0}$=0.0281 at M=0.5 and $C_{D0}$=0.0305 at M=0.7.

EXAMPLE B

In this example, optimization was initiated with the 6F configuration airfoil. The 6F airfoil has a high maximum lift coefficient (1.89), accompanied by a relatively undesirable $C_{D0}$ for Mach numbers above 0.4. The objective of example B was to determine whether it was possible to maintain the $C_{Lmax}$ around 1.89 while reducing its advancing-side drag to a more acceptable level. The drag constraint was relaxed to examine the potential gains in the maximum lift coefficient. Eight design parameters were used in Example B: slat x-position, slat y-position, slat angle, slat camber angle, and four slat thickness functions at various chordwise locations.

TABLE II

Aerodynamic Coefficients for optimization of 6F with $C_{D0}$ at M = 0.5.

| Airfoil | $C_{Lmax}$ (M = 0.35) | $C_{D0}$ (M = 0.5) |
| --- | --- | --- |
| 6F | 1.893 | .0281 |
| 6FM5A | 1.891 | .0255 |
| 6FM5B | 1.907 | .0126 |
| 6FM5C | 1.912 | .0131 |

Figure 6:
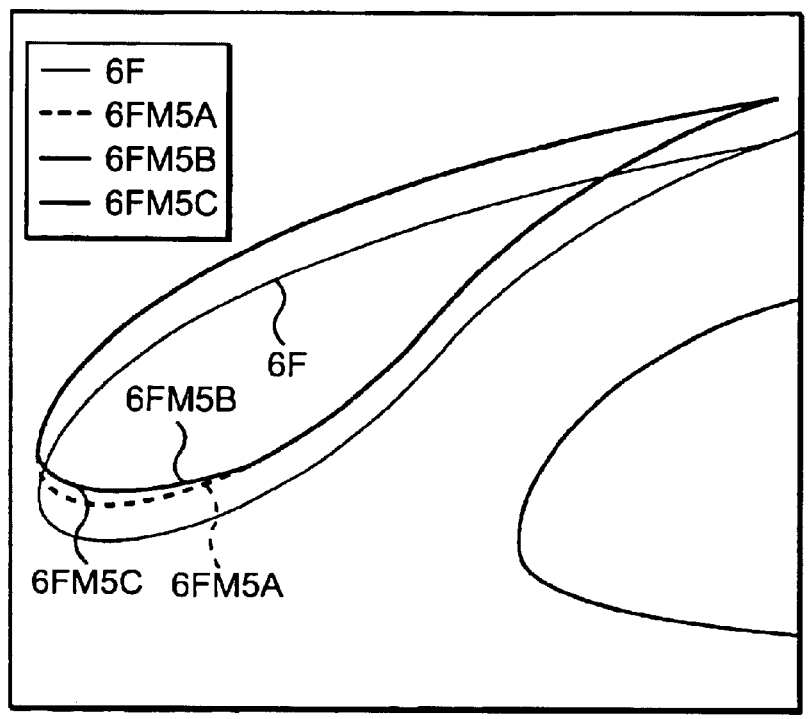
FIG. 6 is a schematic comparison of multiple slat design geometries.
Figure 7:
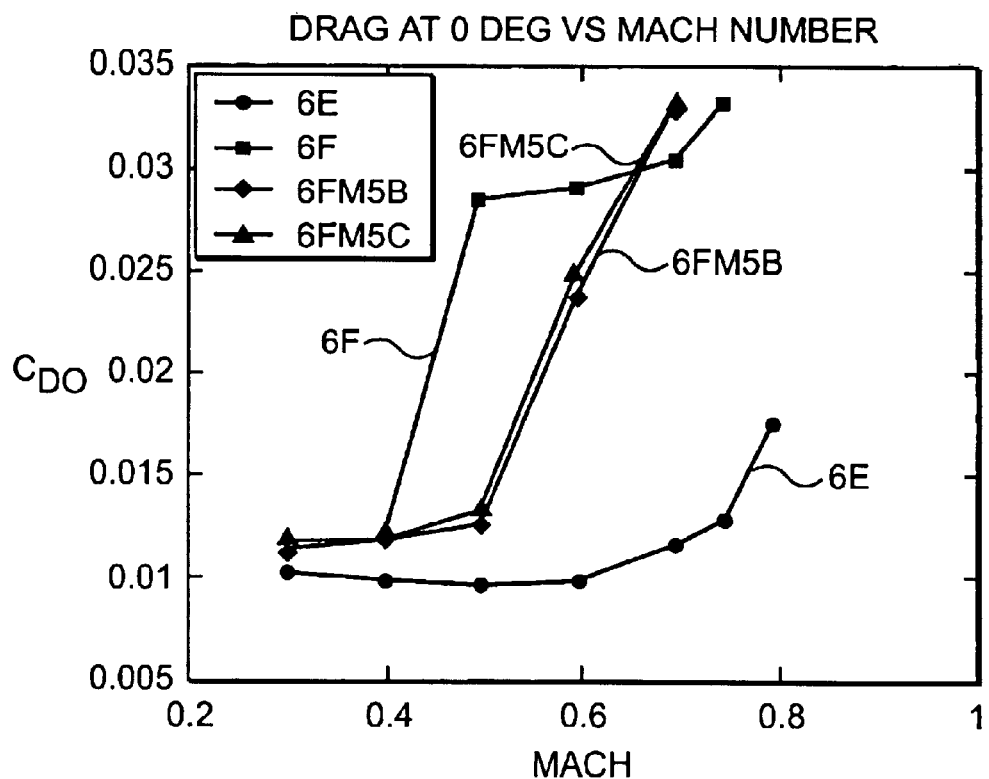
FIG. 7 is a graphical representation of a Mach number sweep for design robustness.

After an initial CFD work, a major impact on the drag ($C_{D0}$ for M=0.5) was achieved and lift was improved. In terms of the geometry, the lower surface of the slat was pushed up (flattened) to reduce the turning around the lower surface, and the resulting shock and flow separation. The mid-chord region was slightly thickened to increase the $C_{Lmax}$ (illustrated somewhat schematically at FIG. 6). The 6F was improved by dropping the drag considerably at alpha=0 degrees. However, neither 6FM5B nor the 6FM5A could be considered to be a robust airfoil design for rotor applications. The result of a Mach number sweep (FIG. 7) from M=0.3 to 0.8 revealed that while the drag was good at M=0.5 (the design point), the low drag characteristics deteriorated rapidly beyond M=0.5. Despite this, for an inboard rotor location, where the local Mach number is not expected to go beyond 0.5, the 6FM5C may be considered a suitable high lift design.

Another optimization from the 6F design provided the 6FM7A and 6FM7B, as listed in Table III.

TABLE III

Aerodynamic Coefficients for optimization of 6F with $C_{D0}$ at M = 0.7.

| Airfoil | $C_{Lmax}$ (M = 0.35) | $C_{D0}$ (M = 0.7) |
| --- | --- | --- |
| 6F | 1.893 | .0305 |
| 6FM7A | 1.86 | .0270 |
| 6FM7B | 1.79 | .0210 |

Figure 8:
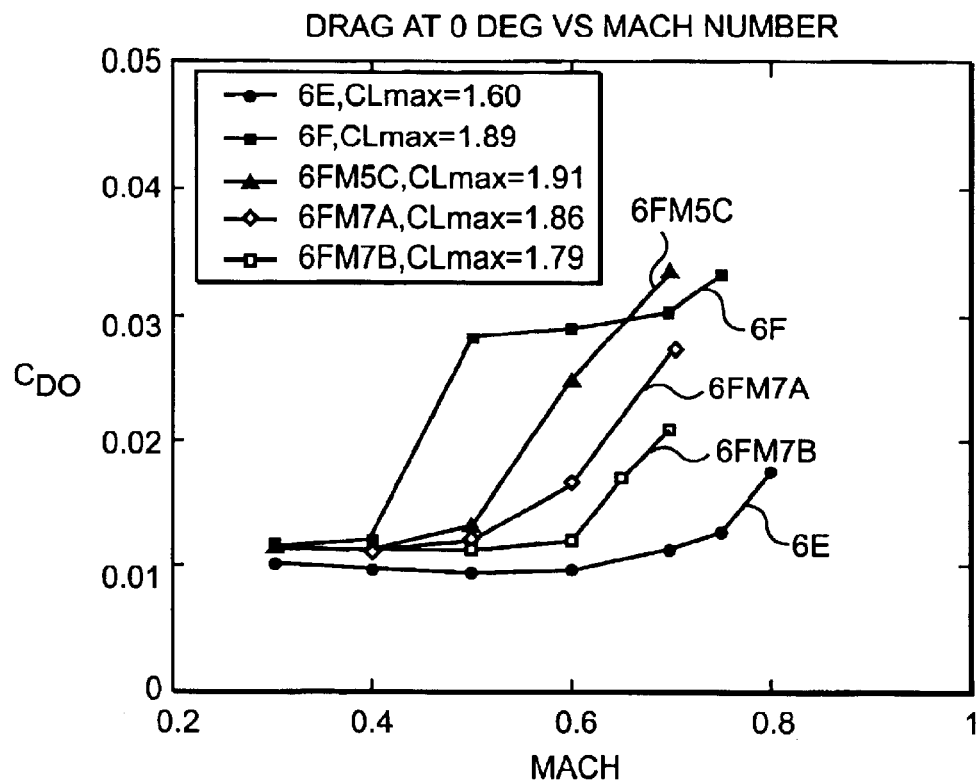
FIG. 8 is another graphical representation of a Mach number sweep for design robustness.
Figure 9:
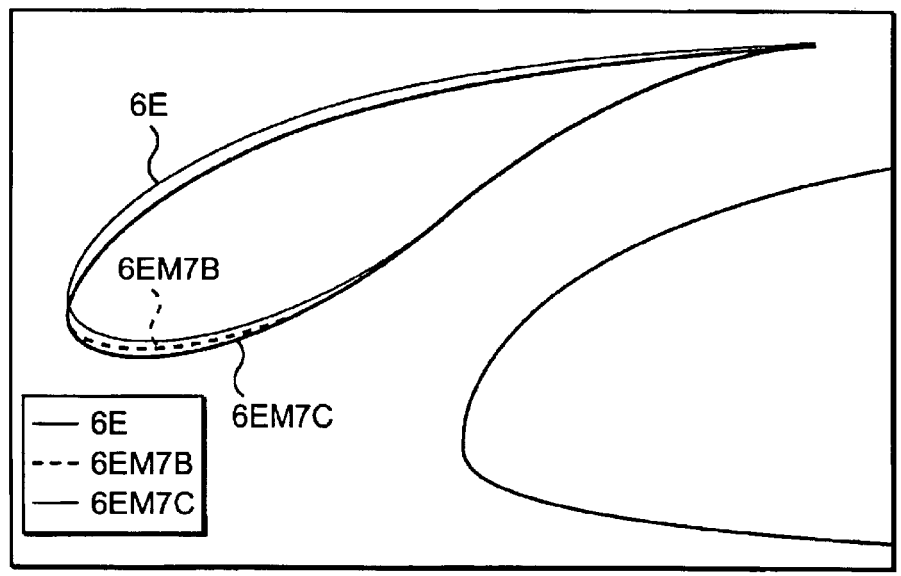
FIG. 9 is a schematic comparison of multiple slat design geometries.

FIG. 8 illustrates the results of a Mach number sweep. The objective to reduce $C_{D0}$ for M=0.7 produced designs with lower drag at M=0.5 and 0.6 as well. Specifically, the 6FM7B has a 30% reduction in $C_{D0}$ at M=0.7, and a 60% reduction in $C_{D0}$ at M=0.5–0.6. These come at a cost of about 5% reduction in $C_{Lmax}$ at M=0.35. Though the drag reduction from the 6F to the 6FM7B at M=0.7 (FIG. 5) was substantial, a $C_{D0}$ of 0.0210 was still too high for this airfoil to be used in the outer sections of the rotor blade. Yet its high lift characteristic makes it an attractive design for the inboard sections where the blade experiences relatively lower Mach numbers.

EXAMPLE C

Example C started from a known high lift, high drag initial multi-element airfoil, and reduced the drag by modifying the slat position and its shape. In Example C, the objective was to improve a design starting with an airfoil with lower drag and lower lift than the 6F. The goal was then to increase the lift while holding the drag low. The baseline design considered for this case was the 6E configuration.

For Example C, the same eight design parameters considered in Example B were utilized. The optimization procedure provided designs called 6EM7B and 6EM7C (i.e. the local optimal). FIG. 15 illustrates the comparison of slat shapes. Table IV compares the aerodynamic coefficients of these airfoils, including the 6F and 6E.

TABLE IV

Summary of 6FM7 and 6EM7 airfoils.

|  | 6E | 6F | 6FM5C | 6FM7B | 6EM7B | 6EM7C |
|---|---|---|---|---|---|---|
| $C_{Do}$ (M = 0.5) | 0.0095 | 0.0285 | 0.0114 | 0.0114 | 0.0099 | 0.00978 |
| $C_{Do}$ (M = 0.6) | 0.0097 | 0.0291 | 0.0131 | 0.0120 | 0.0104 | 0.00981 |
| $C_{Do}$ (M = 0.65) | — | 0.0295* | 0.0248 | 0.0168 | 0.0132 | 0.0104 |
| $C_{Do}$ (M = 0.7) | 0.0114 | 0.0305 | 0.0334 | 0.0210 | 0.0140 | 0.0124 |
| $C_{Do}$ (M = 0.75) | 0.0126 | 0.0333 | — | — | 0.0150 | 0.0136 |
| $C_{Do}$ (M = 0.80) | 0.0174 | — | — | — | 0.0189 | 0.0180 |
| $C_{Lmax}$ (M = 0.35) | 1.60 | 1.89 | 1.86 | 1.79 | 1.75 | 1.73 |
| $C_{Lmax}$ (M = 0.50) | 1.23 | 1.65 | — | 1.66 | — | — |

Figure 10:
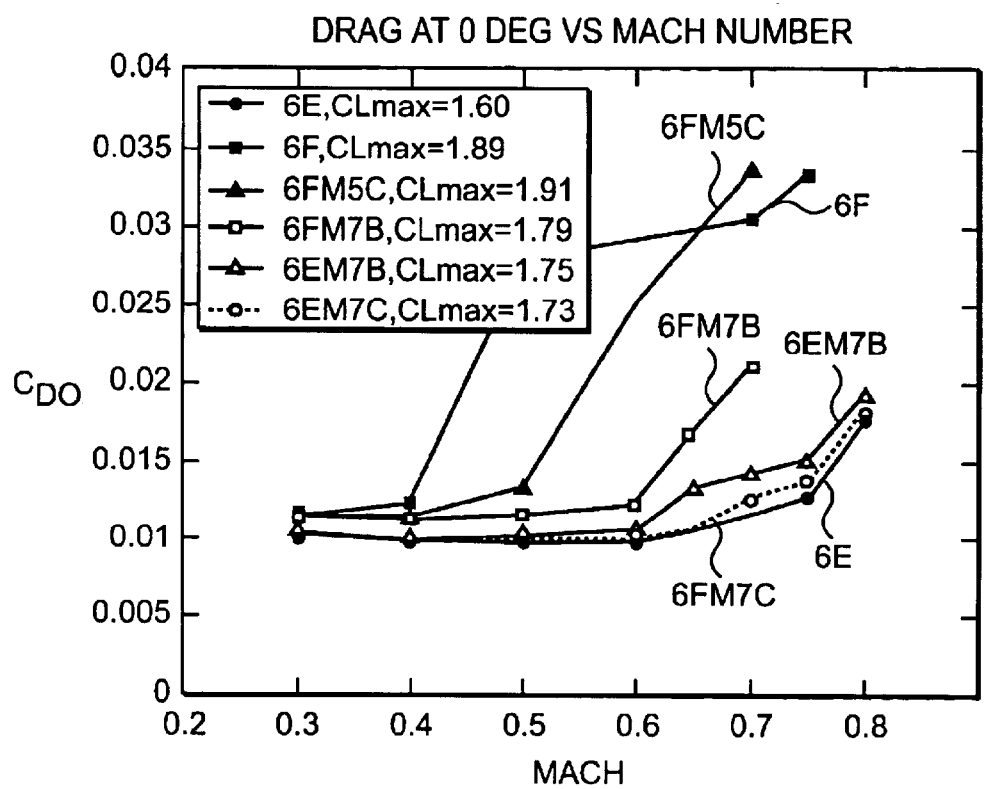
FIG. 10 is a graphical representation of a Mach number sweep for design robustness.

The 6EM7C design has a $C_{Lmax}$=1.73 (M=0.35), and a $C_{D0}$=0.0124 (M=0.7). FIG. 10 illustrates the results of a Mach number sweep for selected multi-element airfoil designs. The drag curve of 6EM7C is virtually identical to that of 6E up to about M=0.65. The $C_{D0}$ at M=0.7 is about 8% higher. Yet the maximum lift is about 10% higher (FIG. 5).

Figure 11:
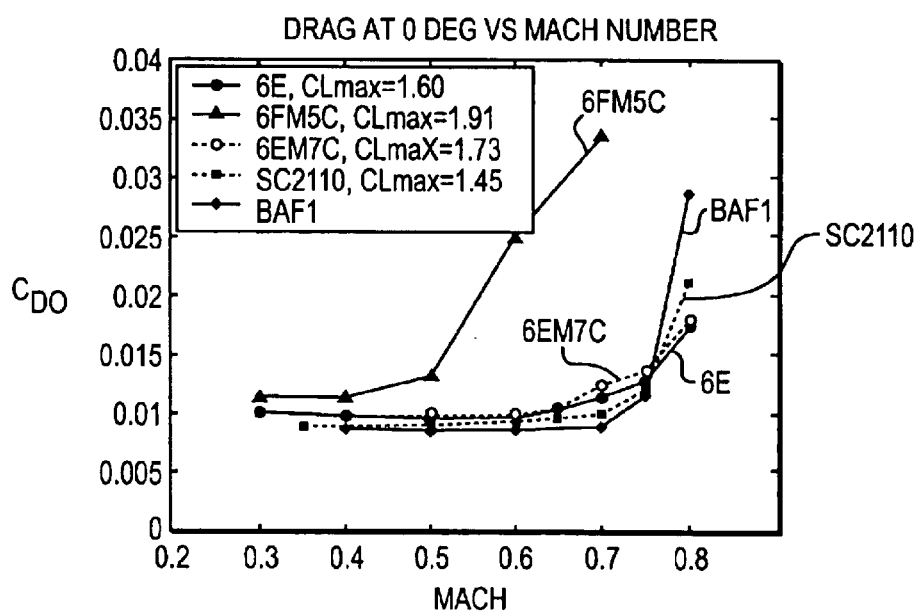
FIG. 11 is another graphical representation of a Mach number sweep for design robustness.

FIG. 11 illustrates a comparison to single element airfoils. Note that, based on the calculations, the 6EM7C, and the 6FM5C, actually have a lower $C_{D0}$ at M=0.8 than the single element. In particular, the computed drag of the BAF1 design (an airfoil designed to blend with the multi-element airfoils) increased rapidly at M=0.8, although it was better to M=0.75.

Figure 12:
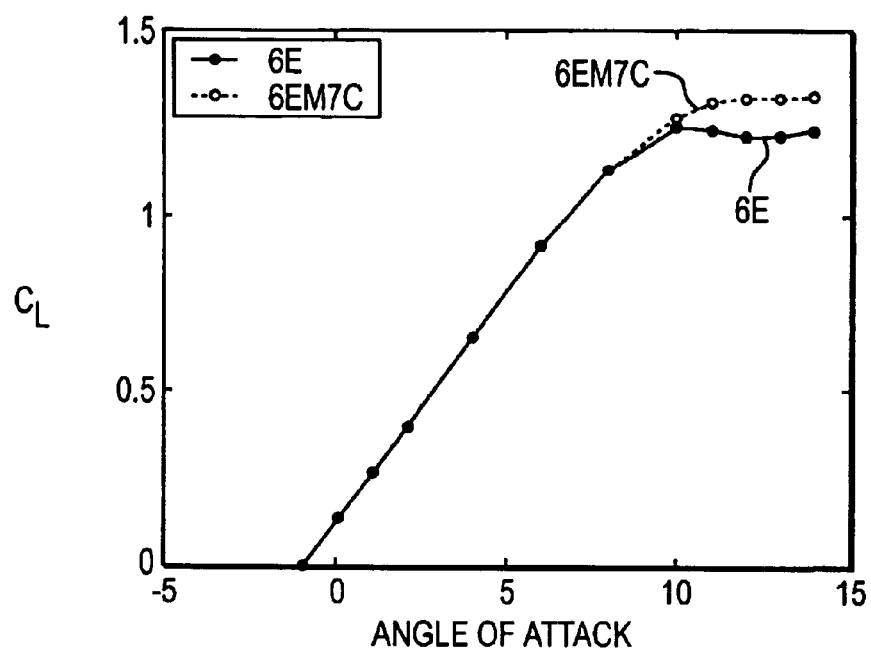
FIG. 12 is a graphical representation of $C_L$ v. Angle of Attack for multi-element rotor blades designed according to the present invention.

FIG. 12 illustrates $C_L$ vs. alpha for the 6E and 6EM7C at M=0.5. These calculations revealed no poor behavior in the 6EM7C design. In summary, the 6EM7C design provides a 20% improvement in maximum lift over Sikorsky's single-element high-lift airfoil, and an over 75% drag reduction from the 6FM7B (FIG. 5). The performance of this design surpasses conventional designs which experience a sharp non-linear rise in drag at high Mach number to achieve the higher lift. For rotor applications, the 6E was a better starting point.

Figure 13:
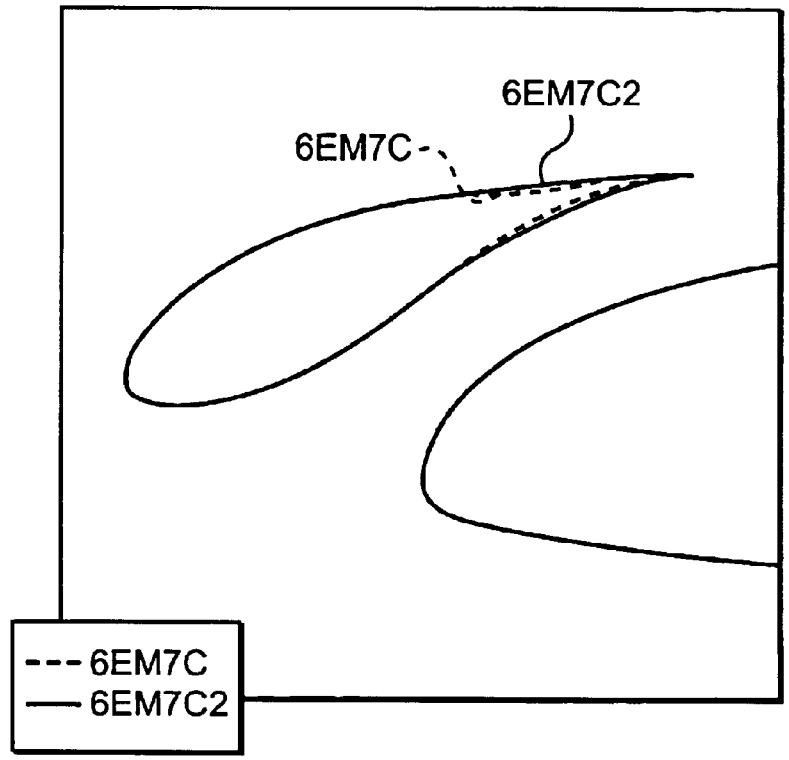
FIG. 13 is a schematic comparison of a slat design geometries pre and post design robustness determination designed according to the present invention.

Any airfoil design will most likely need to be cleaned up to correct minor geometric defects. The 6EM7C (FIG. 13) showed a cusp near the trailing edge of the slat. The cusp posed a structural concern, as well as a potential source of drag at other conditions. The cusp was removed by turning off the eighth design parameter. The cusp-free design was designated 6EM7C2. The aerodynamic coefficients of 6EM7C and 6EM7C2 are listed in Table V.

TABLE V

Aerodynamic coefficients for 6EM7C and 6EM7C2.

| Airfoil | $C_{Lmax}$ (M = 0.35) | $C_{Do}$ (M = 0.7) |
|---|---|---|
| 6EM7C | 1.7308 | 0.012461 |
| 6EM7C2 | 1.7338 | 0.012382 |

Applicant has determined that the differences were very small, and could in fact be within the CFD accuracy threshold. Further analysis confirmed that the performance of 6EM7C2 was very similar to the 6EM7C. Hereafter, the 6EM7C2 airfoil without the cusp is referred to as the 7C.

Figure 14A:
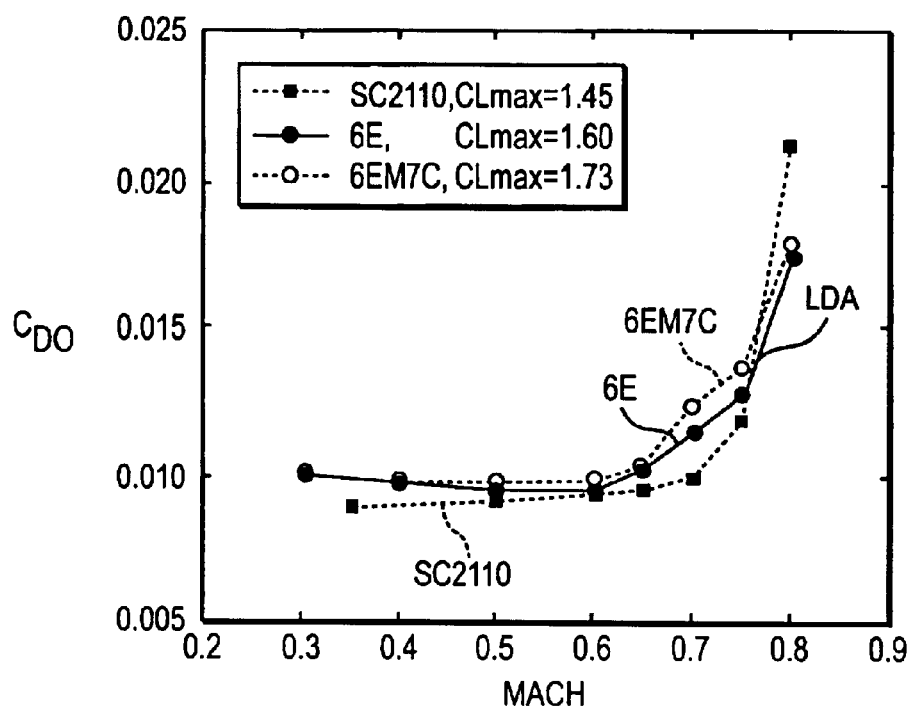
FIG. 14A is a graphical representation of $C_{D0}$ v. Mach number for multi-element rotor blades designed according to the present invention.
Figure 14B:
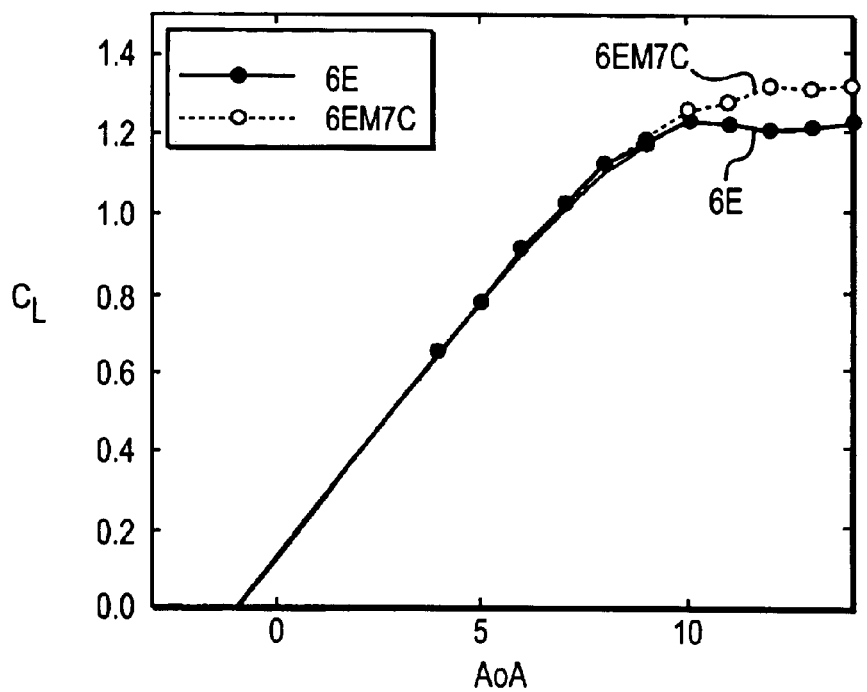
FIG. 14B is a graphical representation of $C_L$ v. Angle of Attack for multi-element rotor blades designed according to the present invention.
Figure 14C:
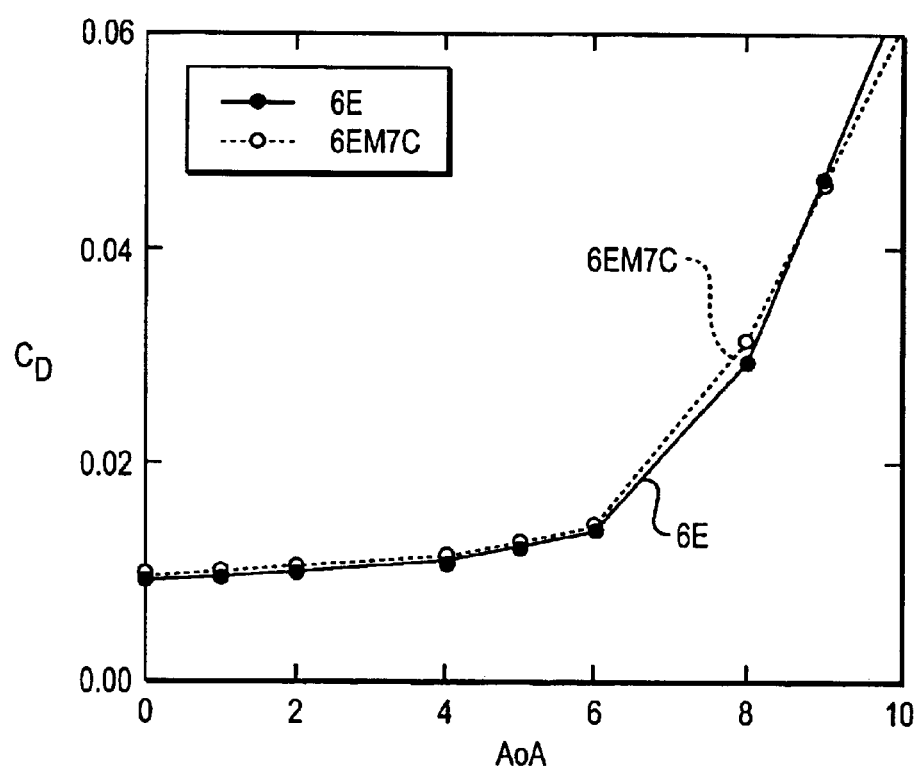
FIG. 14C is a graphical representation of $C_{D0}$ v. Angle of Attack for multi-element rotor blades designed according to the present invention.

FIGS. 14A, 14B and 14C provide comparisons of the lift and drag coefficients for the 6E, and 6EM7C multi-element airfoil designs. The original SC2110 design is included in the $C_{D0}$ vs Mach number comparison. FIG. 14C illustrates the drag coefficient versus angle of attack for M=0.5.

Figure 15A:
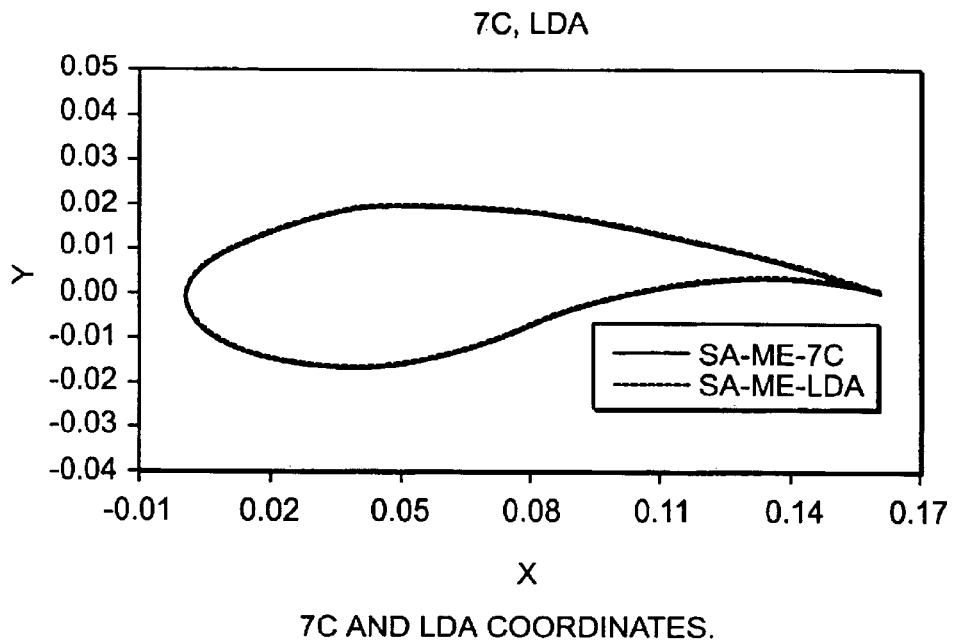
FIG. 15A is a schematic representation of a 7C and LDA slat shape according to the present invention.

Referring to FIG. 15A, slat shapes identified as 7C and LDA are illustrated. FIGS. 15B–15C provide a chart of the coordinates of the 7C and LDA slat configurations. The Slat coordinates are referenced to the slat leading edge (i.e. slat leading edge is at 0,0), and normalized by main-element chord length.

Figure 16A:
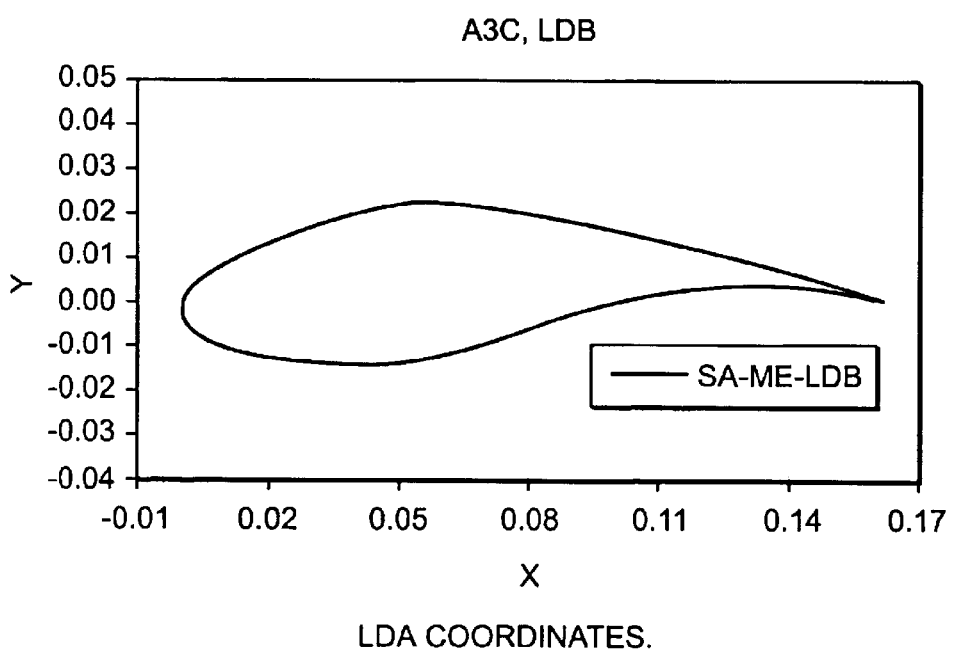
FIG. 16A is a schematic representation of a LDB slat shape according to the present invention.

Referring to FIG. 16A, a slat shape identified as LDB is illustrated. FIG. 16B provides a chart of the coordinates of the LDB slat configuration.

Figures 17A, 18:
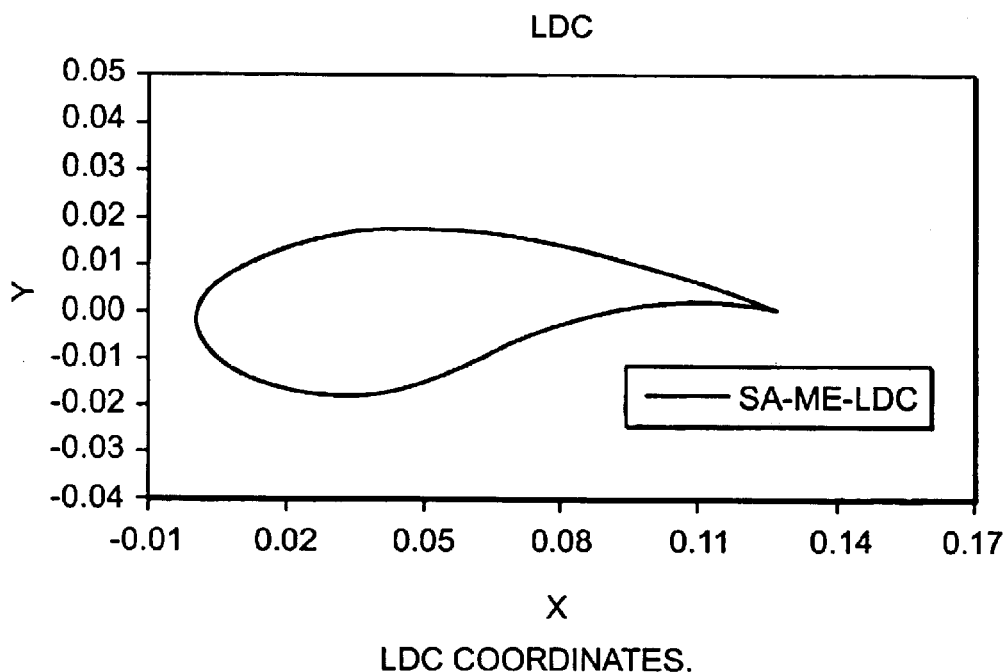
FIG. 17A is a schematic representation of a LDC slat shape according to the present invention.
FIG. 18 is a chart comparing slat thickness, chord length and thickness ratio of the slat shapes disclosed in the present invention.

Referring to FIG. 17A, a slat shape identified as LDC is illustrated. FIG. 17B provides a chart of the coordinates of the LDC slat configuration.

FIG. 18 provides further relative comparisons of the slats.

Features of the 7C (FIG. 15A):
1. Reduced thickness, chord and t/c.
2. Upper surface: flatter surface in forward 25% region of upper surface.
3. Leading edge: Reduced leading-edge radius.

Features of the LDA (FIG. 15A):
1. Reduced thickness, chord and t/c.
2. Upper surface: flatter surface in forward 25% region of upper surface.
3. Leading edge: Reduced leading-edge radius.

Features of the LDB (FIG. 16A):
1. Slightly reduced thickness, chord and t/c.
2. Upper surface: flatter surface in forward 25% region of upper surface.
3. Leading edge: Reduced leading-edge radius.

Features of the LDC (FIG. 17A):
1. 20% reduction in slat chord.
2. Reduced thickness.
3. Increased thickness ratio (t/c).
4. Upper surface: flatter surface in forward 25% region of upper surface.
5. Leading edge: Reduced leading-edge radius.
6. Lower surface: flatter surface near leading-edge.
7. Lower surface: larger "belly" on the under-side of the airfoil.

The foregoing description is exemplary rather than defined by the limitations within. Many modifications and variations of the present invention are possible in light of the above teachings. The preferred embodiments of this invention have been disclosed, however, one of ordinary-skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A multi-element rotor blade for an aircraft comprising: a main element rotatable about an axis of rotation; and a slat fixed to said main element, said slat comprising an airfoil profile in accordance with the chart provided in FIG. 15B.

2. A multi-element rotor blade for an aircraft comprising: a main element rotatable about an axis of rotation; and a slat fixed to said main element, said slat comprising an airfoil profile in accordance with the chart provided in FIG. 15C.

3. A multi-element rotor blade for an aircraft comprising:

a main element rotatable about an axis of rotation; and a slat fixed to said main element, said slat comprising an airfoil profile in accordance with the chart provided in FIG. 16B.

4. A multi-element rotor blade for an aircraft comprising:

a main element rotatable about an axis of rotation; and a slat fixed to said main element, said slat comprising an airfoil profile in accordance with the chart provided in FIG. 17B.

* * * * *